United States Patent [19]

Seko et al.

[11] Patent Number: 5,786,026
[45] Date of Patent: Jul. 28, 1998

[54] METHOD FOR PRODUCING COMPOSITE CATALYTIC MOLDING

[75] Inventors: Hideo Seko, Hashima; Akihito Isomura, Toyota, both of Japan

[73] Assignee: Aisin Seiki Kabushiki Kaisha, Kariya, Japan

[21] Appl. No.: 754,007

[22] Filed: Nov. 20, 1996

[30] Foreign Application Priority Data

Nov. 29, 1995 [JP] Japan .................. 7-335853

[51] Int. Cl.⁶ ............................................ B05D 5/12
[52] U.S. Cl. .................. 427/115; 429/40; 429/209; 29/623.5; 204/290 R; 204/290 F; 204/291
[58] Field of Search ........................ 427/115; 429/40, 429/42, 209; 29/623.5; 204/290 R, 290 F, 291, 292

[56] References Cited

U.S. PATENT DOCUMENTS

| | | | |
|---|---|---|---|
| 3,650,838 | 3/1972 | Giner et al. | 429/40 |
| 4,127,468 | 11/1978 | Alfenaar et al. | 429/40 |
| 4,460,660 | 7/1984 | Kujas | 429/40 |
| 5,028,498 | 7/1991 | Lindstrom | 429/40 |
| 5,178,971 | 1/1993 | Itoh et al. | 429/40 |
| 5,415,759 | 5/1995 | Cawlfield et al. | |

FOREIGN PATENT DOCUMENTS

| | | |
|---|---|---|
| 0 306 945 | 3/1989 | European Pat. Off. |
| 25 53 371 | 6/1976 | German Dem. Rep. |
| 44 17 403 | 11/1994 | Germany . |
| 4-141233 | 5/1992 | Japan . |
| 4-141235 | 5/1992 | Japan . |
| 1 501 102 | 2/1978 | United Kingdom . |

Primary Examiner—Shrive Beck
Assistant Examiner—Brian K. Talbot
Attorney, Agent, or Firm—Oblon, Spivak, McClelland, Maier & Neustadt, P.C.

[57] ABSTRACT

A method for producing a composite catalytic molding containing metallic platinum and metallic ruthenium comprising depositing metallic platinum on a surface of a conductive molding containing conductive material and water repellant material by applying a platinum compound solution on said surface and subjecting said platinum compound to deoxidation, followed by depositing metallic ruthenium on a surface of said conductive molding by applying a ruthenium compound solution on said surface and subjecting said ruthenium compound to deoxidation.

8 Claims, 5 Drawing Sheets 5,786,026

1

METHOD FOR PRODUCING COMPOSITE CATALYTIC MOLDING

BACKGROUND OF THE PRESENT INVENTION

1. Field of the Invention

The present invention relates to a method for carrying a catalytic component containing metallic platinum and metallic ruthenium onto a conductive molding formed of a carbon black or the like.

2. Description of the Related Arts

Conventionally a catalytic component containing metallic platinum and metallic ruthenium has been used, for example, for an anode side of a fuel cell so as to provide good resistance against poisoning caused by CO contained in the fuel such as hydrogen gas. A Publication of JPA No. 97232/1988 has disclosed a method for producing a composite catalytic molding by rendering the above composite catalytic component carried on a carrier formed as a conductive molding.

In the conventional producing method as described above, platinum compound solution is mixed with ruthenium compound solution at a condition where a predetermined pH value is controlled to be constant to obtain colloidal solution having a binary cluster of the platinum and ruthenium. Then hydrogen gas is introduced into the colloidal solution to produce a solid solution alloy of the platinum and ruthenium.

Carbon black particles are added to the colloidal solution containing the solid solution alloy of the platinum and ruthenium. The mixture is stirred, filtered, cleaned and then dried. As a result, a composite catalytic molding is produced in which the catalytic component containing platinum and ruthenium is carried on the carbon black particles.

The above-described producing method has the following disadvantages. In order to produce the mixture of the platinum compound solution and the ruthenium compound solution, conditions of the reaction resulted from mixing such as the pH value should be strictly controlled to be kept to a predetermined value. If the reaction conditions are not controlled to be constant, each composition of the resultant composite catalysts may vary in a wider range, thus failing to provide a high activity ratio.

In the conventional method, the process for the reaction and controlling such process have been complicated.

In order to produce a quality composite catalytic molding through the above conventional method, the production processes have to be complicated, resulting in deteriorated yielding as well as a high production cost.

SUMMARY OF THE INVENTION

It is an object of the present invention to provide a method for producing a composite catalytic molding, providing high yielding and excellent quality and reducing the production cost.

The present invention is realized by a method for producing a composite catalytic molding comprising a step for applying platinum compound solution to a conductive molding containing conductive material and water repellent material, subjecting the molding to deoxidation in deoxidizing air flow such as hydrogen gas and depositing metallic platinum on a surface of the conductive material; and a step for applying ruthenium compound solution to the molding, subjecting the molding to deoxidation in deoxidizing air flow such as hydrogen gas and depositing metallic ruthenium on a surface of the conductive material, by which a catalytic component containing the metallic platinum and the metallic ruthenium is carried on the molding.

This and other objects, features and advantages of the present invention will become more apparent upon a reading of the following detailed description and drawings.

DETAILED DESCRIPTION OF THE INVENTION

Figure 1:
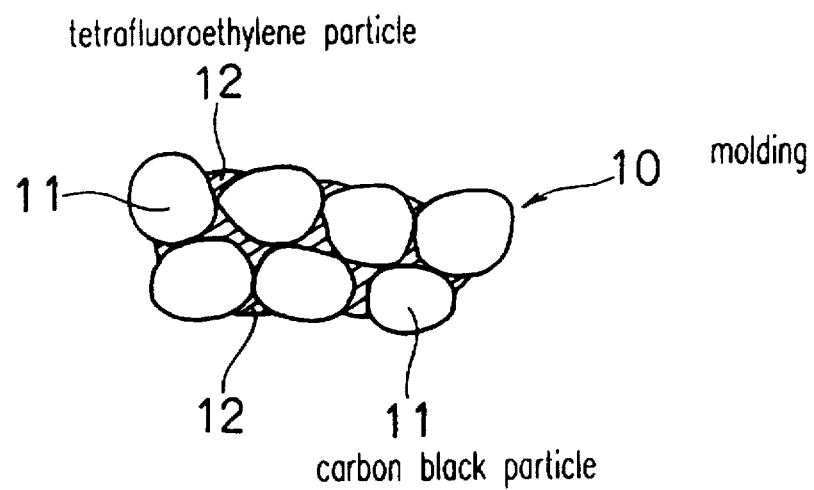
FIG. 1 is an explanatory view showing a construction of a molding of an Example 1.

It is the most important feature of the present invention that the composite catalytic molding is produced by depositing the metallic platinum on the conductive material surface and further depositing the metallic ruthenium thereon. The metallic platinum and the metallic ruthenium are deposited in separate processes in the above deposition order.

As the platinum compound solution, such solution containing platinum chloride, platinum nitrate, platinum complex or the like can be used as described below.

As the ruthenium compound solution, such solution containing ruthenium chloride, ruthenium nitrate, ruthenium complex or the like can be used as described below.

The conductive molding is produced by binding the conductive material with a water-repellent material as a binder.

The conductive material forming the molding may be various kinds of materials, for example, carbon powders such as carbon black particles, black lead, carbon fiber or metallic particles such as noble metal powder, titanium powder or the like.

As the water-repellent material, for example, tetrafluoroethylene (PTFE) or various types of fluororesins can be used.

In a method for producing a composite catalytic molding of the present invention, a certain amount of platinum compound solution containing a predetermined amount of the metallic platinum which should be carried is applied to the above-formed molding, which is then deoxidized. The predetermined amount of the metallic platinum is readily deposited and carried on the above molding.

Next a certain amount of ruthenium compound solution containing a predetermined amount of the metallic ruthenium which should be carried is applied to the molding carrying the metallic platinum, which is then deoxidized. The predetermined amount of the metallic ruthenium is further deposited and carried on the molding carrying the predetermined amount of the metallic platinum.

The composite catalytic molding carrying a catalytic component containing the platinum and ruthenium is obtained.

In the present invention, each of the metallic platinum and the metallic ruthenium is separately deposited in the first and the second processes, respectively. Each deposition amount of the platinum and the ruthenium can be easily defined by the respective application amounts of the platinum compound solution and the ruthenium compound solution. Unlike the conventional method, controlling the reaction conditions such as the pH value to strictly keep to a constant value is no longer required. Therefore the resultant catalytic component has excellent quality with no dispersion in the composition ratio thereof.

The method of the present invention simplifies the production processes and reduces the production cost, as well as improving the yielding.

In this invention, the platinum is deposited first and then the ruthenium is deposited. This deposition order provides the most excellent catalysis quality. In case the deposition order is reversed, i.e., depositing the ruthenium first and then the platinum, or both metals are deposited simultaneously as described in an Example 3, each catalysis of the resultant composite catalytic moldings has been experimentally proved to be inferior to the one produced in the present invention.

It is preferable to use a platinum chloride as the platinum compound in order to obtain excellent deoxidizing capability and to reduce the material cost.

It is preferable to use a ruthenium chloride as the ruthenium compound in order to obtain excellent deoxidizing capability and to reduce the material cost.

It is preferable that the ratio of the ruthenium (Ru) to the platinum (Pt) of the catalytic component, Ru/(Pt+Ru) wt. %, ranges from 18 to 42 wt. %. In case of employing the composite catalytic molding as an anode side of the fuel cell, the obtained catalysis has excellent quality, providing good resistance against poisoning by CO.

Figure 6:
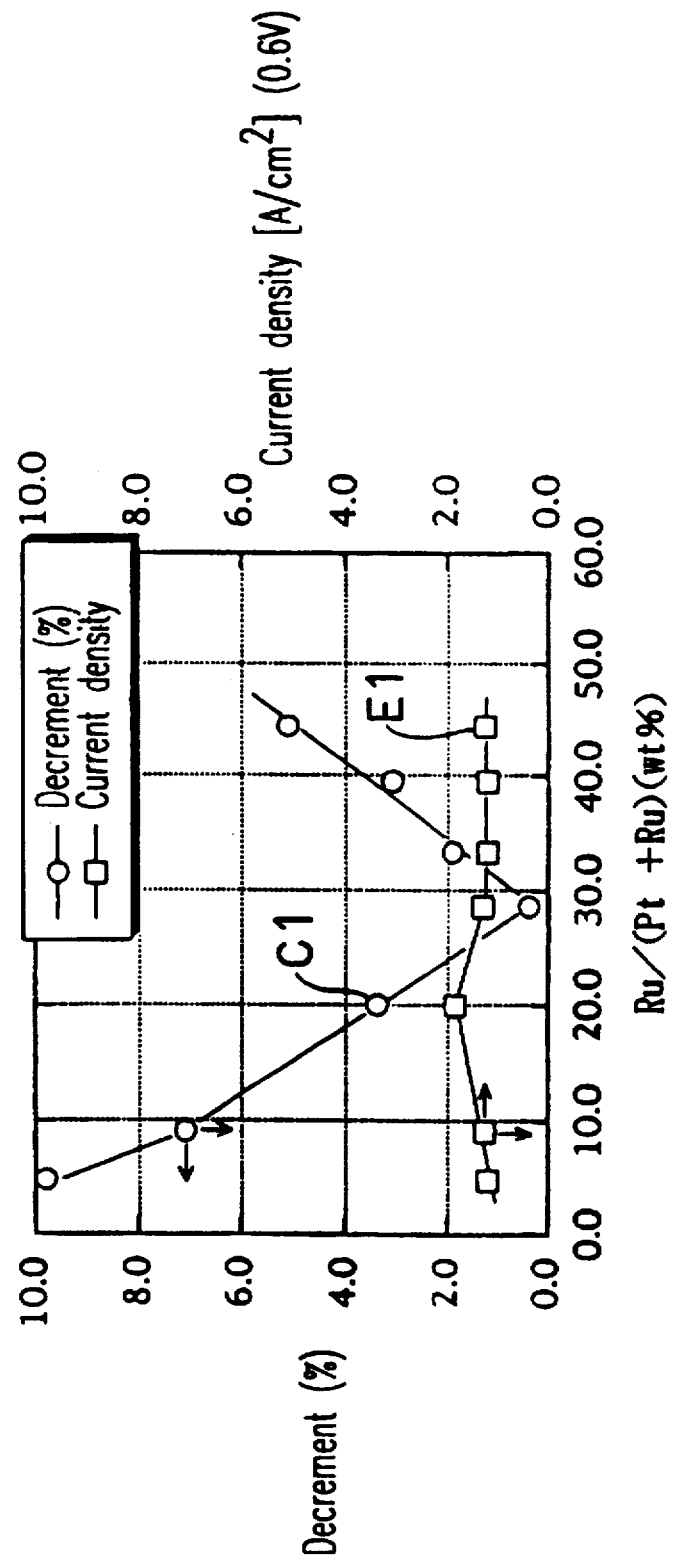
FIG. 6 is a graphical view representing a relationship among Ru/(Pt+Ru) wt. % of the Pt/Ru catalytic component, current density measured when introducing the pure hydrogen, and a decrement (%) in the current density owing to poisoning by CO added to the hydrogen.

Even when carbon monoxide is mixed in the hydrogen supplied to the anode side of the fuel cell, the performance of the fuel cell is not likely to be deteriorated (less affected by poisoning by CO) (See FIG. 6).

If the Ru/(Pt+Ru) wt. % is either less than 18 wt. % or more than 42 wt. %, the performance of the fuel cell is further deteriorated owing to increased poisoning by CO.

It is also preferable to use carbon black particles as the conductive material in order to keep excellent conductivity and corrosion resistance.

It is further preferable to use tetrafluoroethylene as the water-repellent material so that the molding is formed by firmly binding the conductive material and provided with excellent water-repellency.

It is preferable to use the composite catalytic molding as an anode side of a fuel cell. For example, it can be used as an electrode of a fuel cell of a solid polymeric membrance type. In this case, the resultant performance of the electrode becomes highly efficient as well as providing high outputs.

DESCRIPTION OF THE PREFERRED EXAMPLE

Example 1

Figure 2:
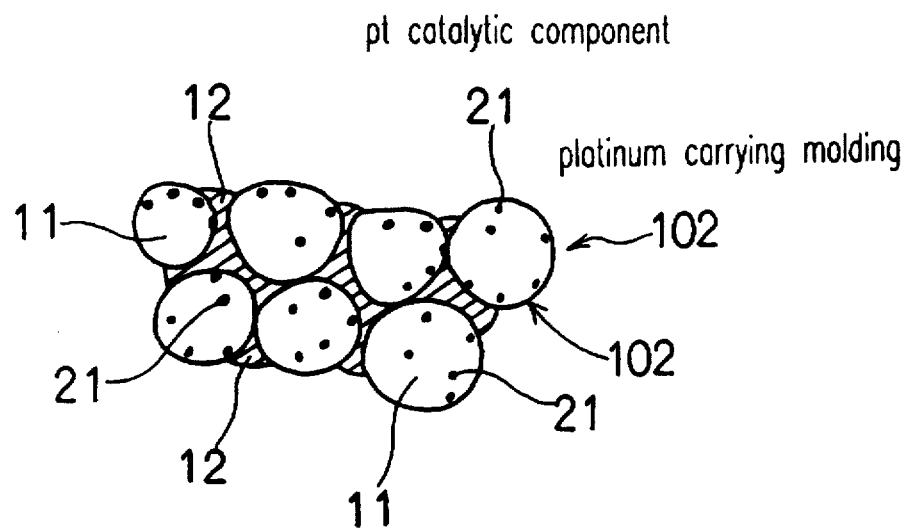
FIG. 2 is an explanatory view showing a platinum (Pt) carrying molding with the platinum catalytic component carried on the molding of the Example 1.
Figure 3:
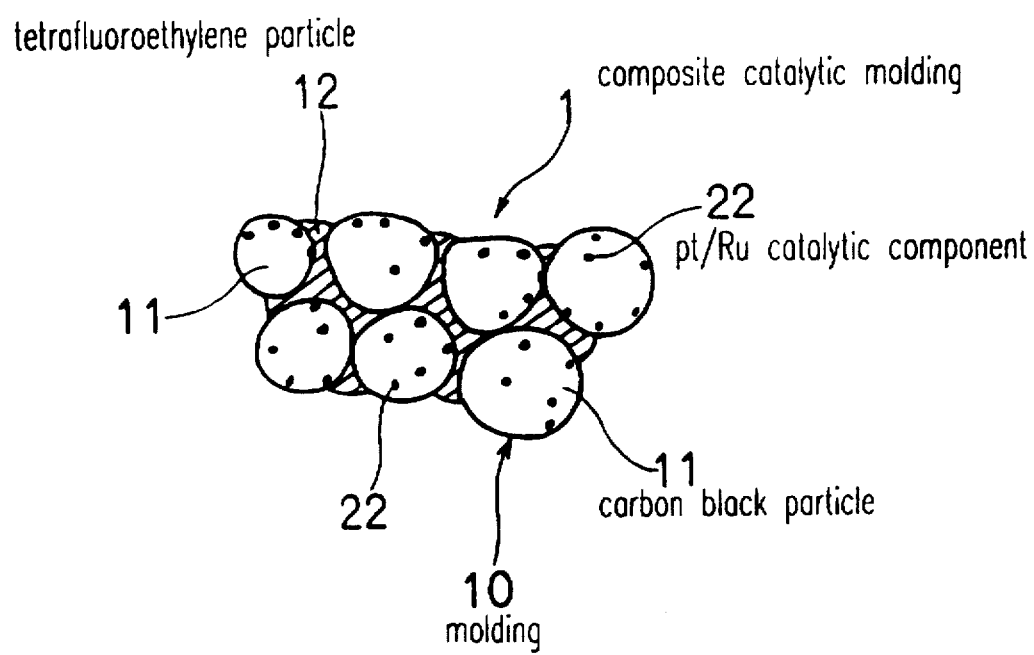
FIG. 3 is an explanatory view showing a composite catalytic molding with the catalytic component containing platinum and ruthenium (Ru) carried on the molding of the Example 1.

A method for producing a composite catalytic molding of an Example 1 of the present invention is described referring to FIGS. 1 to 3.

As FIG. 1 shows, a molding 10 formed of a mixture of carbon and Teflon was prepared as a conductive molding for producing a composite catalytic molding 1. The molding 10 was formed of carbon black particles 11 and tetrafluoroethylene particles 12 functioning as a binder for binding those carbon black particles 11 as well as providing water-repellency.

Then the metallic platinum was deposited on the molding 10.

First 1.0 g of platinic acid chloride was dissolved in 10 ml of ethanol to prepare the platinum compound solution. The molding 10 was immersed in the platinum compound solution and impregnated by 0.15 ml/10 cm$^2$. This amount was equivalent to the amount for carrying 0.5 mg/cm$^2$ of the platinum.

The molding 10 which has been impregnated with the solution was kept under the condition at 150° C. to 200° C. for 30 to 60 seconds for drying by dissipating the ethanol. The molding 10 was then subjected to deoxidation with hydrogen gas under the condition at 180° C. for 4 to 5 hours. As a result, fine metallic platinum particles were uniformly deposited on the carbon black particles 11 of the molding 10 as shown in FIG. 2, providing a platinum carrying molding 102 carrying a Pt catalytic component 21.

The metallic ruthenium was deposited on a surface of the platinum carrying molding 102.

First 1.0 g of ruthenium chloride solution was dissolved in 10 ml of ethanol to prepare the ruthenium compound solution. The platinum carrying molding 102 was immersed in the solution and impregnated by 0.06 ml/cm$^2$. This amount was equivalent to the amount for carrying 0.2 mg/cm$^2$ of the ruthenium. The ratio of the ruthenium to the platinum was 28.5 wt. % (Ru×100/(Pt+Ru)).

The platinum carrying molding 102 impregnated with the solution was kept under condition at 150° C. to 200° C. for 30 to 60 seconds for drying by dissipating the ethanol. Then it was subjected to deoxidation with hydrogen gas under the condition at 180° C. for 4 to 5 hours. As shown in FIG. 3, fine metallic ruthenium particles were uniformly deposited on a surface of the platinum carrying molding 102, providing the composite catalytic molding 1 carrying the catalytic component 22 (Pt/Ru catalytic component) containing the platinum and ruthenium.

In the method for producing the composite catalytic molding 1 of the present invention, the metallic platinum and the metallic ruthenium were separately deposited in the respective processes. Each deposition amount of the platinum and the ruthenium can be easily defined by each application amount of the respective solutions.

Therefore unlike the conventional producing method, controlling the reaction conditions such as the pH value or the like is no longer required. The resultant catalytic component has excellent quality with no dispersion in the composition ratio thereof. As a result, the production process can be simplified, the production cost is reduced and the yielding is improved.

Example 2

In this example, the composite catalytic molding 1 of the Example 1 was formed into an anode side 71. While the platinum carrying molding 102 carrying no ruthenium was used as a cathode side 72. The anode side 71 and the cathode side 72 were used to form a fuel cell 7. The ratio of the ruthenium to platinum of the Pt/Ru catalytic component 22 of the fuel cell 71 was varied to measure the resultant poisoning by CO.

The above-prepared fuel cell 7 is described hereinafter.

Figure 4:
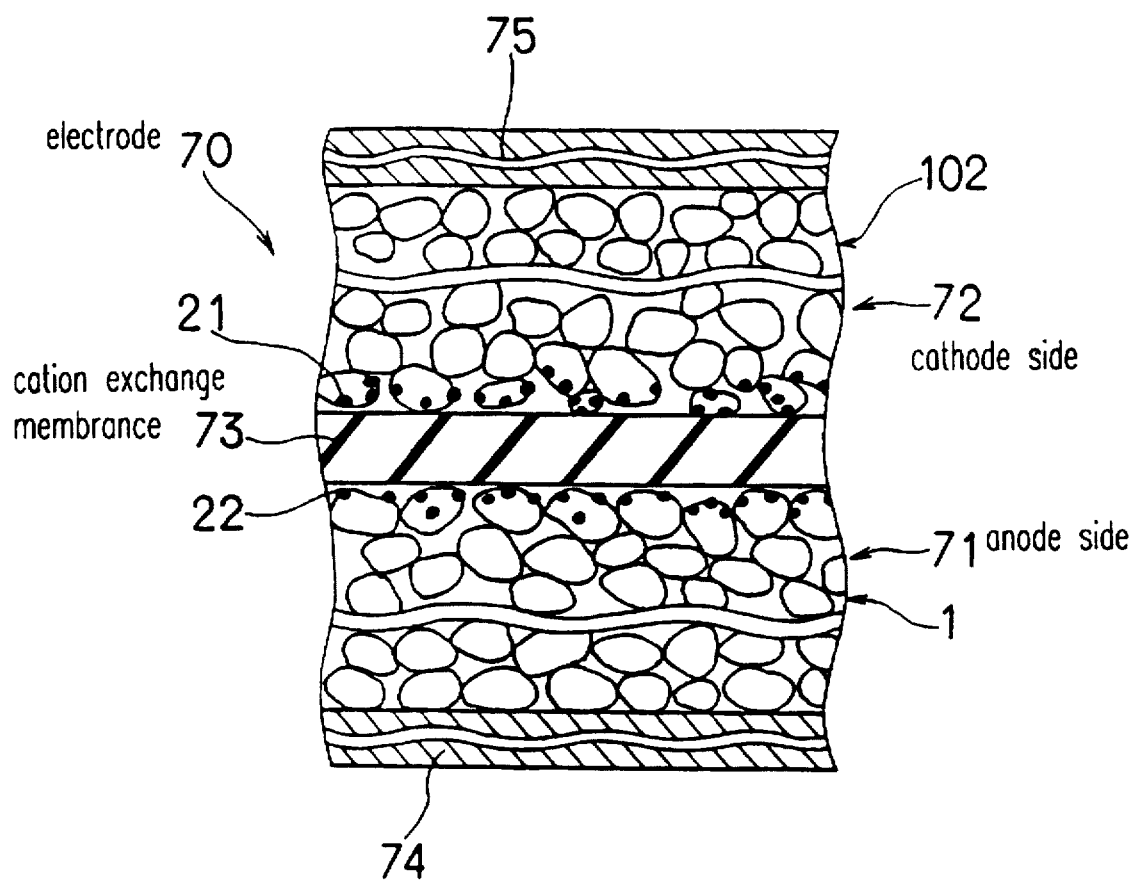
FIG. 4 is an explanatory view showing a construction of an electrode of a fuel cell of an Example 2.

The fuel cell 7 was of a solid polymeric membrance type, using an electrode 70 formed of the anode side 71, the cathode side 72 and a cation exchange membrane 73 as electrolyte as shown in FIG. 4.

The anode side 71 was obtained by applying a cation exchange resin to the composite catalytic molding 1.

That is Nafion™ (produced by Du Pont Co.) as the cation exchange resin was dissolved in organic solvent containing 90 wt. % of isopropanol and 10 wt. % of water to prepare solution containing 5 wt. % of Nafion. Then the Nafion solution was applied to the composite catalytic molding 1 by 0.12 ml/10 cm².

The resultant composite catalytic molding 1 was set in a vacuum dryer for drying at a room temperature for about 2 hours so as to remove alcohol and water. In this way the anode side 71 was obtained by applying the cation exchange resin to the composite catalytic molding 1.

The cathode side 72 was obtained by applying the cation exchange resin to the platinum carrying molding 102 in the same manner as in producing the anode side 71.

As the cation exchange membrance 73 functioning as the electrolyte, Nafion was used.

Referring to FIG. 4, the cation exchange membrance 73 was interposed between the anode side 71 and the cathode side 72. Each of electrode base materials 74 and 75 was provided to the outside of the respective anode side 71 and the cathode side 72. Those electrode base materials 74 and 75 served as carbon fiber current collectors rendered with water-repellency by the tetra-fluoroethylene.

The above-formed structure was heated to 100° C. and kept under the condition at 165° C. and at a pressure of 80 kg/cm² for 90 seconds.

It was cut into a circular plate having a diameter of 60 mm, providing an electrode 70 of a polymeric membrance type.

Figure 5:
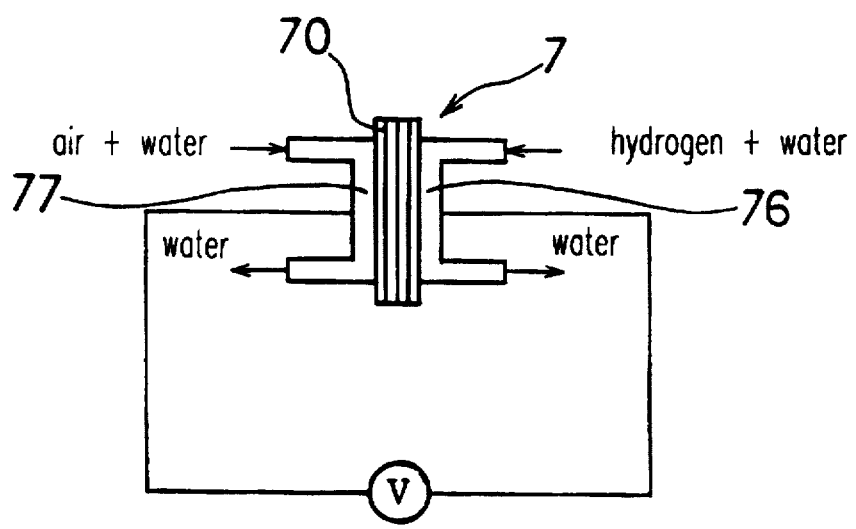
FIG. 5 is an explanatory view showing a construction of the fuel cell of the Example 2.

Referring to FIG. 5, supply pipes 76 and 77 were provided to the respective electrode base materials 74 and 75 of the electrode 70 of the polymeric membrance type so as to provide the fuel cell 7. The supply pipe 76 supplied vapor and hydrogen to the electrode base material 74 of the anode side 71 and drained generated water. The supply pipe 77 supplied air and vapor to the electrode base material 75 of the cathode side 72 and drained generated water.

With the above-constructed fuel cell 7, each Ru/(Pt+Ru) wt. % of the anode side 72 was varied so that the resultant poisoning by CO was measured in the following way.

Various types of fuel cells each having different Ru/(Pt+ Ru) wt. % of the Pt/Ru catalytic component were prepared. The current density of each fuel cell when introducing pure hydrogen without containing CO gas was measured. Next the current density of each fuel cell when introducing hydrogen gas mixed with 50 ppm of CO gas was measured. The decrement (%) in the current measured.

The measurement result is shown in a graph of FIG. 6, taking Ru/(Pt+Ru) wt. % as an axis of abscissa, the current density as a right axis of ordinate and the decrement (%) in the current density resulted from adding CO to the hydrogen as a left axis of ordinate, respectively.

Points of the current density measured when introducing pure hydrogen (E1) and points of decrement (C1) in the current density measured when adding CO to hydrogen were plotted, respectively.

As FIG. 6 shows, each current density measured when introducing pure hydrogen was appropriately equivalent even when the Ru/(Pt+Ru) wt. % was varied. Only at a point of the Ru/(Pt+Ru) wt. % set to 28.5 wt. %, the decrement measured well in spite of adding 50 ppm of CO. However, as the Ru/(Pt+Ru) wt. % increased or decreased from the point of 28.5 wt. %, the decrement became high, i.e., increasing poisoning by CO. In order to produce the catalytic component with less poisoning by CO, it is important to specify the Ru/(Pt+Ru) wt. % to be in the range from 18 to 42 wt. %.

Example 3

This example varied the process for carrying the catalytic component to the anode side 71 of the fuel cell 7 of the Example 2 so as to observe the influence to the performance of the cell.

Three types of fuel cells were used, one employing the anode side 71 using the composite catalytic molding produced through the producing method described in the Example 1 (present invention:E2) and the other two employing anode sides using composite catalytic moldings produced through different producing methods (Comparative examples C2 and C3), respectively.

The comparative example C2 was obtained through the method by reversing the order of deposition, i.e., depositing the ruthenium first and then the platinum. Other processes are the same as those of the Example 1.

The comparative example C3 used the composite catalytic molding produced through depositing the platinum and ruthenium simultaneously. More specifically mixture solution containing predetermined amounts of platinum chloride and ruthenium chloride was applied to the molding, which was subjected to deoxidation with hydrogen gas. As a result, the platinum and ruthenium were deposited and carried simultaneously. Other processes were the same as those of the Example 1. Each of fuel cells E2, C2 and C3 had the same Ru/(Pt+Ru) wt. % of the Pt/Ru catalytic component, which was set to 28.5 wt %.

Then each cell voltage to the current density of the above 3 types of fuel cells was measured. The gauge pressure at the anode side and the gauge pressure at the cathode side at power generation were set to 0.5 kg/cm² and 1.0 kg/cm², respectively.

Figure 7:
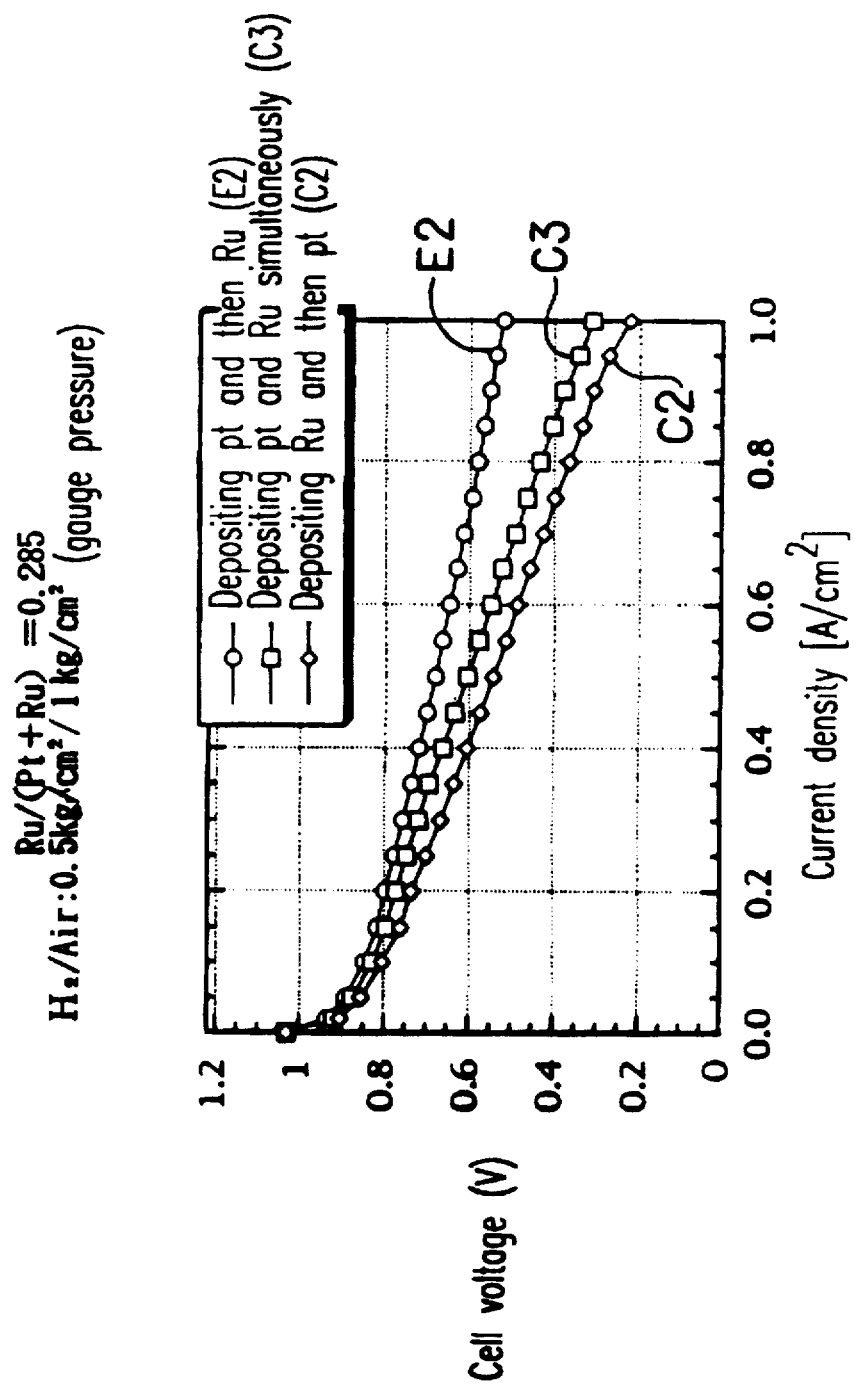
FIG. 7 is a graphical representation showing each performance of 3 types of fuel cells using composite catalytic moldings produced through different processes in an Example 3.

The measurement results are shown in a graph of FIG. 7, taking the current density as an axis of abscissa and the cell voltage as an axis of ordinate. The respective measurement points of those fuel cells E2, C2 and C3 were plotted.

Referring to FIG. 7, the fuel cell E2 using the composite catalytic molding as the anode side produced through the method of the present invention shows higher cell voltage compared with those of C2 and C3 over a whole measurement area, indicating excellent performance as the fuel cell.

The comparative examples C2 and C3 show inferior performances to the E2 over the whole measurement area, particularly in the area where the current density is high.

This indicates that the catalytic component obtained by depositing the platinum first and then ruthenium separately may provide the highest performance.

As aforementioned, the present invention provides a method for producing a composite catalytic molding for realizing improved yielding, excellent quality as well as a low production cost.

What is claimed is:

1. A method for producing a composite catalytic molding containing metallic platinum and metallic ruthenium comprising:

depositing metallic platinum on a surface of a conductive molding containing conductive material and water repellant material by applying a platinum compound solution on said surface and subjecting said platinum compound to deoxidation, followed by depositing metallic ruthenium on a surface of said conductive molding by applying a ruthenium compound solution on said surface and subjecting said ruthenium compound to deoxidation.

2. The method of claim 1, wherein each deoxidation is carried out in hydrogen gas.

3. The method of claim 1, wherein said platinum compound is a platinum chloride.

4. The method of claim 1, wherein said ruthenium compound is a ruthenium chloride.

5. The method of claim 1, wherein a ratio of said ruthenium (Ru) to said platinum (Pt) of said catalytic component as Ru/(Pt+Ru) value is set to range from 18 to 42 wt. %.

6. The method of claim 1, wherein said conductive material is formed of carbon black particles.

7. The method of claim 1, wherein said water-repellent material is formed of tetra-fluoroethylene.

8. The method of claim 1, said composite catalytic molding is used for making an anode side of a fuel cell.

* * * * *